US008556005B2

(12) United States Patent
Ozawa et al.

(10) Patent No.: US 8,556,005 B2
(45) Date of Patent: Oct. 15, 2013

(54) FORKLIFT

(75) Inventors: Kazuaki Ozawa, Oyama (JP); Kouichi Ariizumi, Shimotsuke (JP); Tsutomu Komatsu, Hasuda (JP); Yuuichi Fukata, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/698,092

(22) PCT Filed: Jul. 21, 2011

(86) PCT No.: PCT/JP2011/066571
§ 371 (c)(1), (2), (4) Date: Nov. 15, 2012

(87) PCT Pub. No.: WO2012/029430
PCT Pub. Date: Mar. 8, 2012

(65) Prior Publication Data

US 2013/0164155 A1 Jun. 27, 2013

(30) Foreign Application Priority Data

Aug. 31, 2010 (JP) ................................ 2010-194761

(51) Int. Cl.
*B60K 17/28* (2006.01)

(52) U.S. Cl.
USPC ........................................................ 180/53.1

(58) Field of Classification Search
USPC ................ 180/6.48, 53.1, 305, 306, 308, 337
See application file for complete search history.

(56) References Cited

U.S. PATENT DOCUMENTS

| | | | | |
|---|---|---|---|---|
| 6,257,080 | B1 * | 7/2001 | Shin | 74/325 |
| 6,543,311 | B1 | 4/2003 | Baginski et al. | |
| 6,554,084 | B1 | 4/2003 | Enmeiji | |
| 6,877,580 | B2 * | 4/2005 | Hasegawa et al. | 180/292 |

(Continued)

FOREIGN PATENT DOCUMENTS

| | | | |
|---|---|---|---|
| DE | 19955312 | A1 | 6/2001 |
| DE | 102004028620 | A1 | 11/2006 |

(Continued)

OTHER PUBLICATIONS

International Search Report dated Aug. 30, 2011, issued for PCT/JP2011/066571.

(Continued)

*Primary Examiner* — Paul N Dickson
*Assistant Examiner* — Robert A Coker
(74) *Attorney, Agent, or Firm* — Edwards Wildman Palmer LLP

(57) ABSTRACT

In a forklift, power is transmitted to a traveling pump and an operating machine pump through a PTO unit provided to an output shaft of an engine along front-rear direction of a vehicle body. The traveling pump is disposed to a first face of the PTO unit facing the hydraulic motor. An input shaft of the traveling pump is offset from the output shaft of the engine. The drive shaft of the hydraulic motor is offset from the output shaft of the engine and the input shaft of the traveling pump. The hydraulic motor is side by side with the traveling pump. The operating machine pump is mounted to a second face of the PTO unit mounted with the engine. An input shaft of the operating machine pump is offset from the traveling pump. The operating machine pump is under the engine to be side by side with the engine.

3 Claims, 7 Drawing Sheets

(56) References Cited

U.S. PATENT DOCUMENTS

| | | | | |
|---|---|---|---|---|
| 2002/0166712 | A1* | 11/2002 | Ishimaru et al. | 180/337 |
| 2006/0042843 | A1* | 3/2006 | Yasuda et al. | 180/65.1 |
| 2006/0196710 | A2 | 9/2006 | Banginski et al. | |
| 2010/0131163 | A1 | 5/2010 | Shinohara | |

FOREIGN PATENT DOCUMENTS

| | | | |
|---|---|---|---|
| JP | 31-18728 | Y1 | 11/1956 |
| JP | 60-93518 | U | 6/1985 |
| JP | 7-8039 | U | 2/1995 |
| JP | 10-067239 | A | 3/1998 |
| JP | 3562965 | B2 | 1/2000 |
| JP | 2000-318994 | A | 11/2000 |
| JP | 2007-254046 | A | 10/2007 |
| JP | 2008-279834 | A | 11/2008 |
| JP | 2009-056983 | A | 3/2009 |

OTHER PUBLICATIONS

Torsten Kohmäscher et al., "Antriebsstrangkonzepte mobiler Arbeitsmaschinen," O+P, vol. 49, Mar. 2005, pp. 154-157 and partial English translation thereof.

D. Findeisen, "Oil Hydraulics, Manual for the hydrostatic power transmission in fluid technology," Springer, 2006, pp. 18-20, 27-30, & 39 and partial English translation thereof.

Office Action dated Jul. 22, 2013, issued for the corresponding German Patent Application No. 11 2011 101 538.0 and English translation thereof.

* cited by examiner

FORKLIFT

FIELD

The present invention relates to a forklift and particularly to a forklift which is driven by a hydraulic motor to travel.

BACKGROUND

Among forklifts, there are forklifts which are driven by hydraulic motors to travel. In such a forklift, separate hydraulic motors are connected to left and right front wheels which are drive wheels and oil is supplied from traveling hydraulic pumps to the respective hydraulic motors to cause the forklift to travel. The hydraulic motors are mounted in a vehicle body in such attitudes that their drive shafts are along a left-right direction of the vehicle body. The traveling hydraulic pumps are driven by an engine and disposed on an extended line of an output shaft of the engine. The engine is mounted in a state in which the output shaft is along a front-rear direction of the vehicle body (see Patent Document 1, for example).

In a forklift, mast cylinders for moving forks up and down are mounted to axle cases housing drive axles, in general. In the forklift in which the hydraulic motors are connected to the front wheels as described above, the axle cases have larger diameters than those in the forklift without the hydraulic motors and therefore positions of the mast cylinders are displaced forward with respect to the drive axles. If the mast cylinders are displaced forward, weight of a counterweight needs to be set to a large value in order to secure stability during handling of loads and dimensions of an outside shape of the vehicle body increases as compared with those in prior art even if maximum weight of a load to be treated is the same, which significantly affects mobility of the forklift due to increase in a turning radius and the like.

To solve such a problem, power of a hydraulic motor may be divided and transmitted to the left and right front wheels. To put it concretely, a differential gear is provided between left and right drive axles and the hydraulic motor and the power of the hydraulic motor may be transmitted to the left and right front wheels through the differential gear. In this forklift, it is essential only that the drive axles be disposed between the differential gear and the front wheels, which does not increase the diameters of the axle cases. As a result, distances between the drive wheels and the mast cylinders may be set to about the same values as those in conventional forklifts, the counterweight does not need to be increased, and the forklift can be driven by the hydraulic motor to travel.

CITATION LIST

Patent Literature

Patent Literature 1: Japanese Patent Application Laid-open No. 2000-318994

SUMMARY

Technical Problem

However, between the engine and the drive axles, not only a traveling hydraulic pump for supplying oil to the hydraulic motor but also an operating machine hydraulic pump for supplying oil to the mast cylinders and tilt cylinders are disposed. Therefore, in order to dispose the hydraulic motor between the engine and the drive axles without increasing the dimensions of the outside shape of the vehicle body, the traveling hydraulic pump and the operating machine hydraulic pump need to be miniaturized, which may be disadvantageous for traveling performance and operating performance. Incidentally, the hydraulic motor may be provided side by side with the traveling hydraulic pump in the left-right direction or a vertical direction of the vehicle body to thereby secure desired capacities of the traveling hydraulic pump and the operating machine hydraulic pump. However, the hydraulic motor which is a heavy load is disposed in a position largely displaced from a center line of the vehicle body, which is not preferable from a viewpoint of weight balance and may affect mobility.

With the above circumstances in view, it is an object of the present invention to provide a forklift driven by a hydraulic motor, in which mobility is secured by suppressing increase in dimensions of an outside shape of a vehicle body without impairing traveling performance and operating performance.

Solution to Problem

To overcome the problems and achieve the object, according to the present invention, A forklift comprises: an engine mounted in a state in which an output shaft is along a front-rear direction of a vehicle body; a traveling hydraulic pump and an operating machine hydraulic pump driven by the engine; and a hydraulic motor operated by oil supplied from the traveling hydraulic pump, power of the hydraulic motor being transmitted to a drive axle to cause the forklift to travel, wherein a PTO unit is provided to the output shaft of the engine, power is configured to be respectively transmitted to the traveling hydraulic pump and the operating machine hydraulic pump through the PTO unit, and the traveling hydraulic pump is disposed to a first face of the PTO unit facing the hydraulic motor in a state in which an input shaft of the traveling hydraulic pump is offset from the output shaft of the engine, and the hydraulic motor is disposed in a state in which the drive shaft of the hydraulic motor is offset from the output shaft of the engine and the input shaft of the traveling hydraulic pump, respectively, and the hydraulic motor is arranged side by side with the traveling hydraulic pump and the operating machine hydraulic pump is mounted to a second face of the PTO unit mounted with the engine, and an input shaft of the operating machine hydraulic pump is offset from the traveling hydraulic pump, and the operating machine hydraulic pump is disposed under the engine to be side by side with the engine.

According to the present invention, the forklift further comprising an axle case housing therein the drive axle, wherein the hydraulic motor is mounted to the axle case in a state in which a drive shaft of the hydraulic motor is disposed along the output shaft of the engine.

According to the present invention, the traveling hydraulic pump and the hydraulic motor are of variable displacement type and connected by a hydraulic closed circuit to form an HST.

Advantageous Effects of Invention

According to the present invention, because the traveling hydraulic pump is disposed in a state in which its input shaft is offset from the output shaft of the engine, the traveling hydraulic pump and the hydraulic motor can be arranged side by side without loosing weight balance. Therefore, it is possible to suppress increase in dimensions of an outside shape of the vehicle body to secure mobility without impairing traveling performance and operating performance.

DESCRIPTION OF EMBODIMENT

A preferred embodiment of a forklift according to the present invention will be described below with reference to the accompanying drawings.

Figure 1:
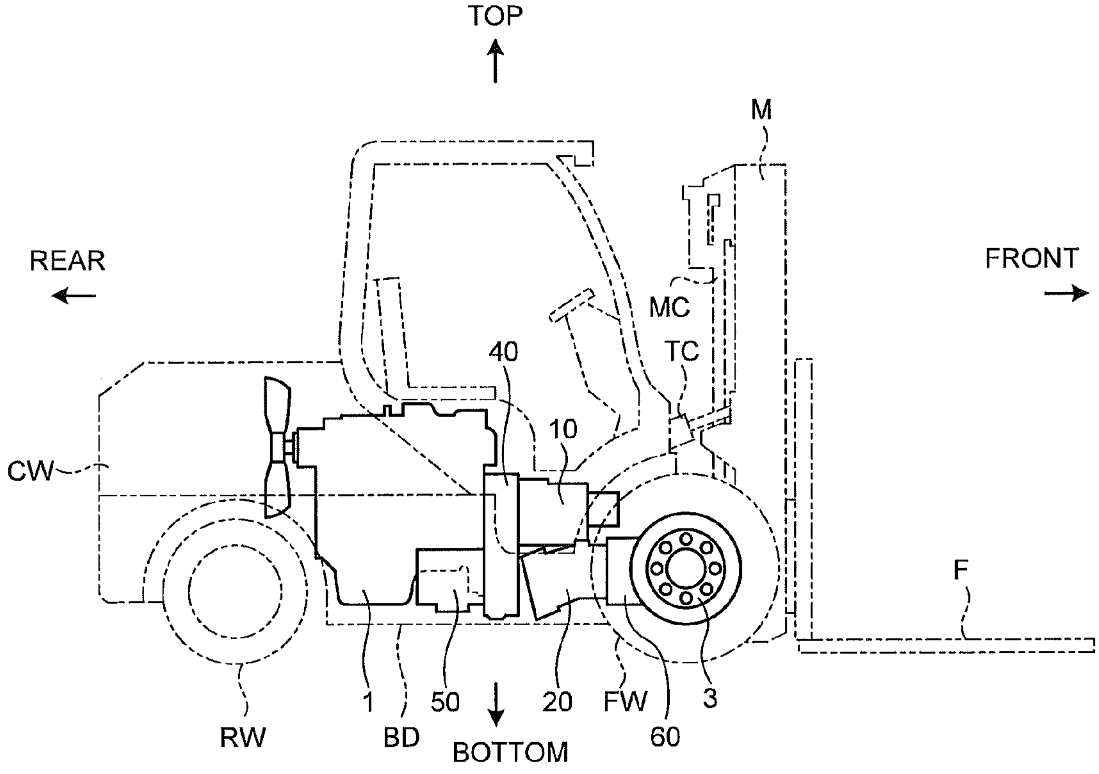
FIG. 1 is a side view conceptually illustrating a forklift which is an embodiment of the present invention.
Figure 2:
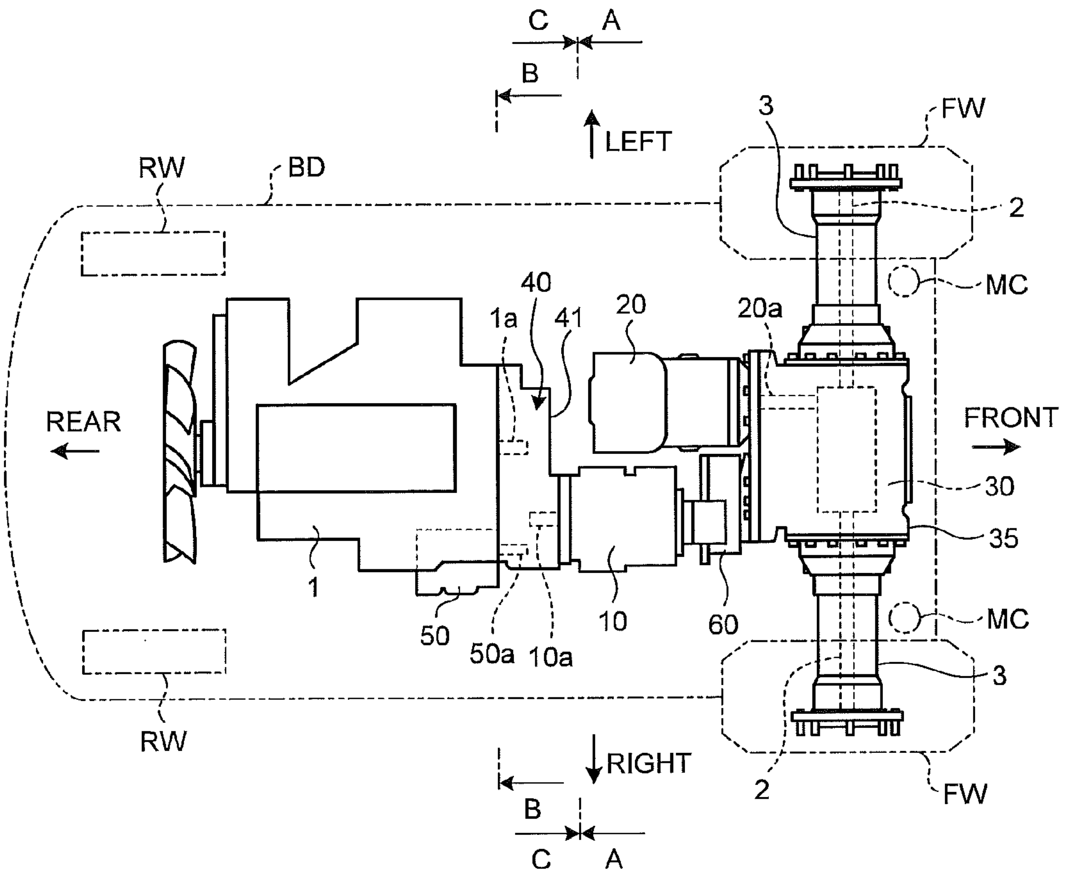
FIG. 2 is a plan view conceptually illustrating an arrangement of a power train from an engine to drive axles of the forklift illustrated in FIG. 1.
Figure 3:
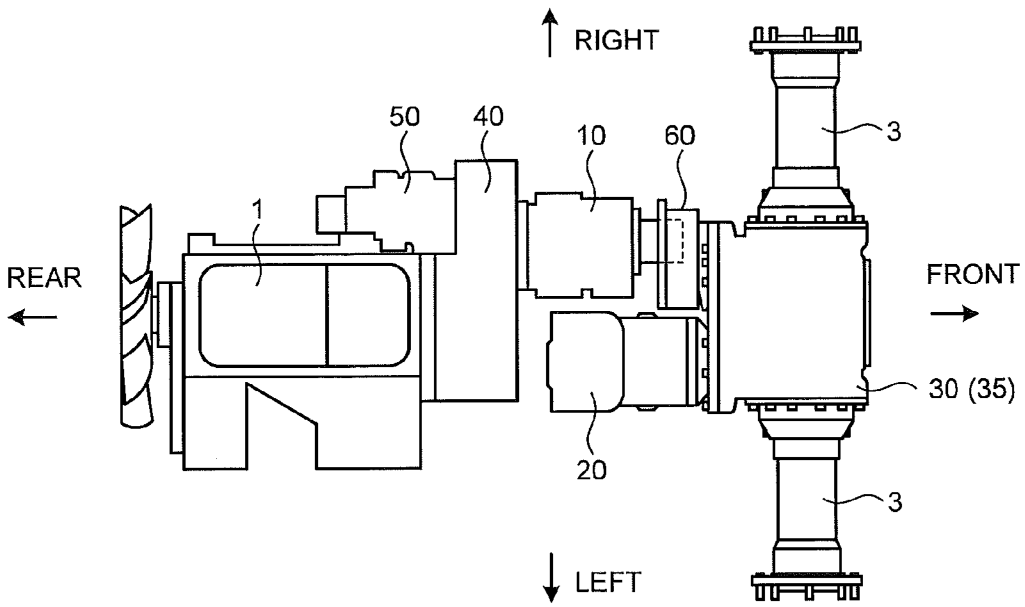
FIG. 3 is a bottom view conceptually illustrating the arrangement of the power train from the engine to the drive axles of the forklift illustrated in FIG. 1.

FIGS. 1 to 3 show the forklift which is the embodiment of the invention. The forklift shown here as an example travels with front wheels FW serving as drive wheels and rear wheels RW serving as steered wheels and lifts and lowers loads with forks F provided in front of a vehicle body BD. The forks F are supported on masts M provided along a vertical direction. The forks F can be moved in the vertical direction by driving of mast cylinders MC provided between the masts M and the forks F. Although it is not clearly shown in the drawings, lower end portions of the masts M are supported to be rotatable about a horizontal axis along a left-right direction with respect to the vehicle body BD. The masts can be brought into forward tilting attitudes and rearward tilting attitudes by driving of tilt cylinders TC provided between the vehicle body BD and the masts M. In the forklift, a traveling hydraulic pump 10, a hydraulic motor 20, and a transfer device 30 are disposed between an engine 1 mounted in the vehicle body BD and axle cases 3 housing front axles 2 which are drive axles.

The engine 1 is an internal combustion engine to be driven by burning fuel such as gasoline and light oil. As shown in FIGS. 2 and 3, the engine 1 is mounted in the vehicle body BD in a state in which an output shaft 1*a* is along a front-rear direction of the vehicle body BD and a tip end of the output shaft 1*a* of the engine 1 faces forward at a substantially central position of the vehicle body BD in the left-right direction.

Figure 4:
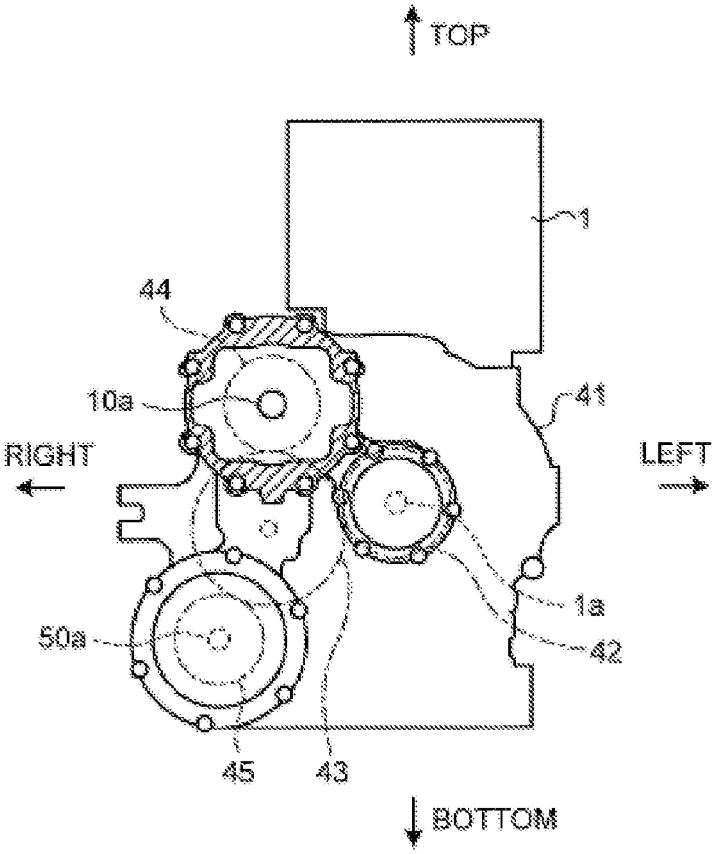
FIG. 4 is a sectional view taken along line A-A in FIG. 2.
Figure 5:
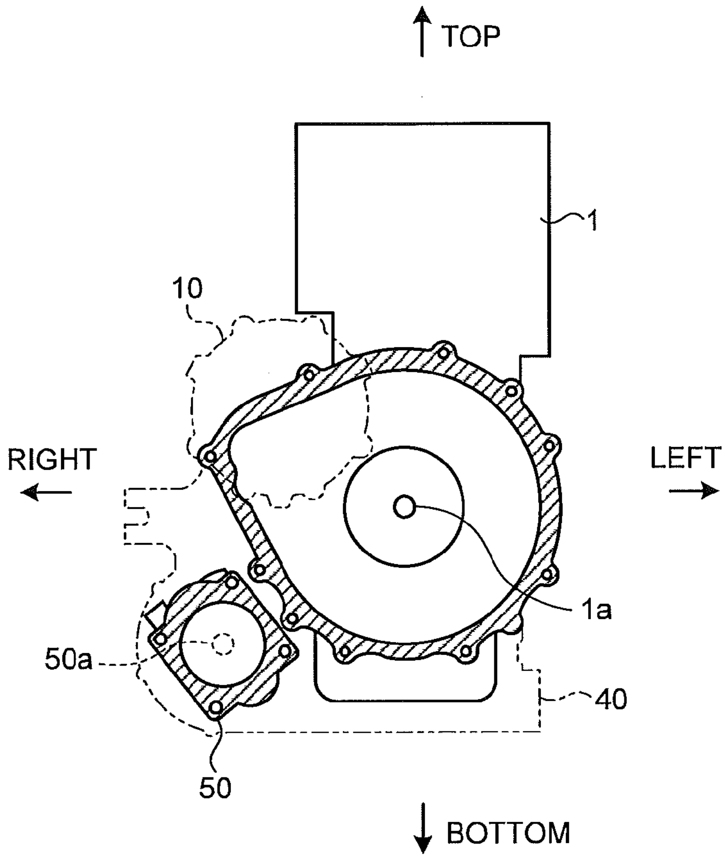
FIG. 5 is a sectional view taken along line B-B in FIG. 2.

The traveling hydraulic pump 10 is of variable displacement type in which a displacement can be changed arbitrarily. The traveling hydraulic pump 10 is mounted to a unit case 41 of a PTO unit 40 in a state in which a pump input shaft 10*a* is along the front-rear direction of the vehicle body BD and a tip end of the pump input shaft 10*a* is oriented to a rear side of the vehicle body BD. The PTO unit 40 is a structure for outputting power of the engine 1 to an outside and is formed in the unit case 41 covering the output shaft 1*a* of the engine 1. To explain it concretely, the PTO unit 40 is a structure in which a first pump gear 44 and a second pump gear 45 are engaged with a drive gear 42, provided to the output shaft 1*a* of the engine 1, with an idler gear 43 interposed therebetween as shown in FIG. 4. This PTO unit 40 can transmit the power to the first pump gear 44 and the second pump gear 45 through the drive gear 42 and the idler gear 43 when the engine 1 is driven. The first pump gear 44 and the second pump gear 45 are provided so that their axial centers are along the front-rear direction of the vehicle body BD in positions offset from the output shaft 1*a* of the engine 1. More specifically, the idler gear 43 is in the position offset from the output shaft 1*a* of the engine 1 toward a right side of the vehicle body BD. The first pump gear 44 is in an upper right position of the vehicle body BD with respect to the output shaft 1*a* of the engine 1 and a lower peripheral face of the first pump gear 44 is engaged with an upper peripheral face of the idler gear 43. The second pump gear 45 is in a lower right position of the vehicle body BD with respect to the output shaft 1*a* of the engine 1 and an upper peripheral face of the second pump gear 45 is engaged with a lower peripheral face of the idler gear 43.

In the embodiment, the first pump gear 44 is provided to the pump input shaft 10*a* of the traveling hydraulic pump 10 and the second pump gear 45 is provided to a pump input shaft 50*a* of an operating machine hydraulic pump 50. The traveling hydraulic pump 10 is mounted on a front face of the unit case 41 facing the axle cases 3. The operating machine hydraulic pump 50 is for supplying oil to the mast cylinders MC and the tilt cylinders TC. The operating machine hydraulic pump 50 is mounted side by side with the engine 1 on a back face of the unit case 41 mounted with the engine 1 as shown in FIGS. 2 to 5.

Figure 6:
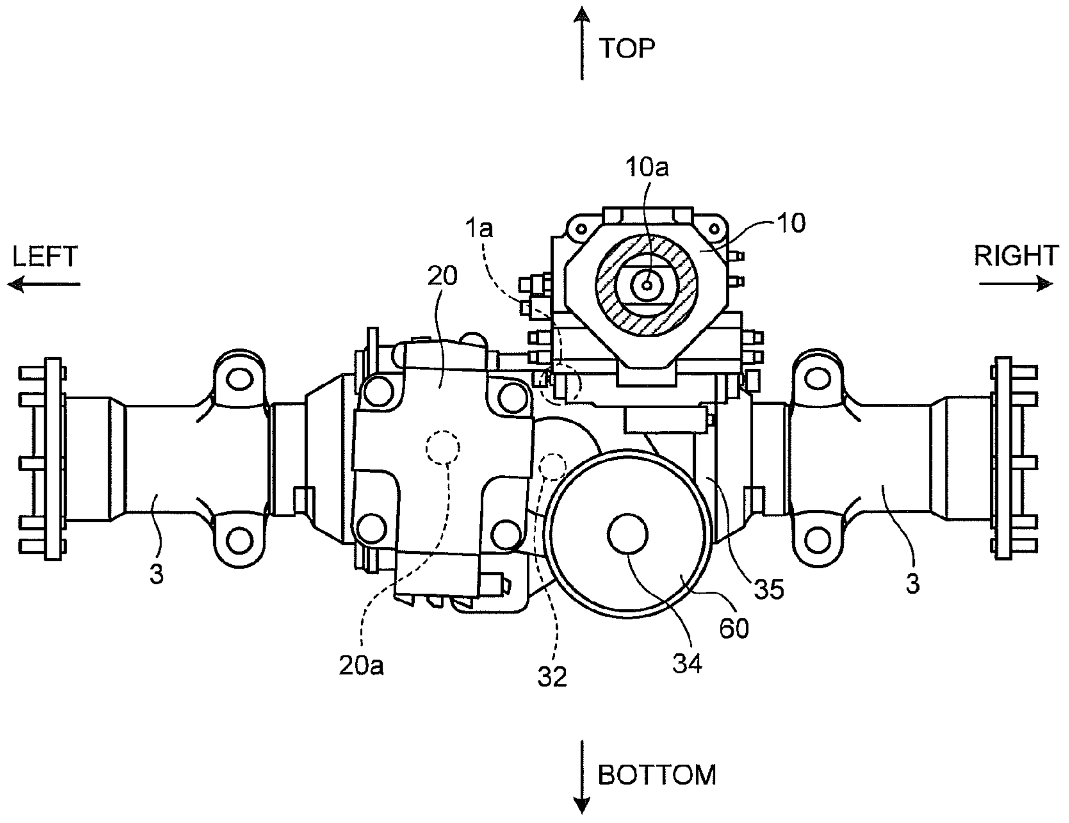
FIG. 6 is a sectional view taken along line C-C in FIG. 2.
Figure 7:
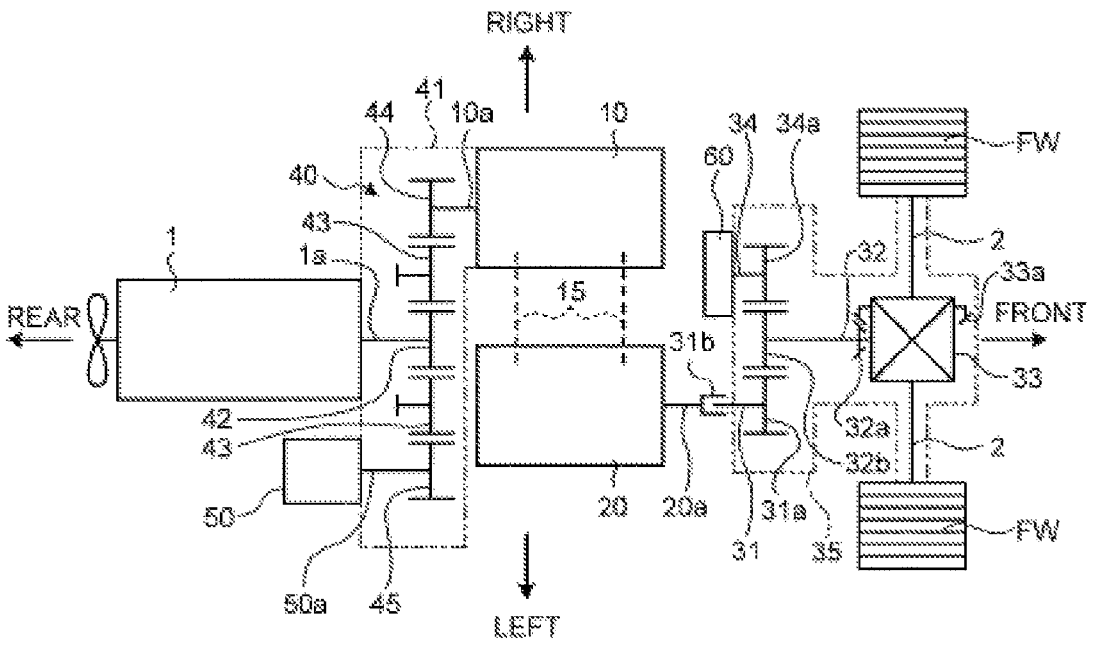
FIG. 7 is a skeleton diagram of the power train from the engine to the drive axles of the forklift illustrated in FIG. 1 and seen from below.

The hydraulic motor 20 is of variable displacement type in which a displacement can be changed arbitrarily. The hydraulic motor 20 is mounted to a back face of the axle case 3 in a state in which a drive shaft 20*a* is along the front-rear direction of the vehicle body BD and a tip end of the drive shaft 20*a* is oriented to a front side of the vehicle body BD as shown in FIGS. 2 and 3. As shown in FIG. 6, the drive shaft 20*a* of the hydraulic motor 20 is displace to a lower left position of the vehicle body BD with respect to the pump input shaft 10*a* so that the hydraulic motor 20 does not come in contact with the traveling hydraulic pump 10. As shown in FIG. 7, the hydraulic motor 20 and the traveling hydraulic pump 10 are connected by a hydraulic closed circuit 15 to form a hydraulic transmission mechanism called HST (Hydro-Static Transmission) and the hydraulic motor 20 is driven by the oil supplied from the traveling hydraulic pump 10.

The transfer device 30 is formed with the drive shaft 20*a* of the hydraulic motor 20 serving as an input and divides power from the drive shaft 20*a* and transmits it to the left and right front axles 2. The transfer device 30 includes a main input shaft 31, a differential input shaft 32, a differential mechanism 33, and an idle shaft 34.

The main input shaft 31 has a main input gear 31*a* at its base end portion and a spline 31*b* on an outer periphery of its tip end portion and is rotatably supported in a transfer case 35. The main input shaft 31 has the tip end oriented to the rear side of the vehicle body BD and is coupled to the drive shaft 20*a* of the hydraulic motor 20 by the spline 31*b* at the tip end portion and disposed coaxially with the drive shaft 20*a*. The differential input shaft 32 has a differential input gear 32*a* at its base end portion and a transfer gear 32*b* at its tip end portion. The differential input shaft 32 is rotatably supported in the transfer case 35 in a state in which the base end is oriented to the front side of the vehicle body BD and the transfer gear 32*b* is engaged with the main input gear 31*a* of the main input shaft 31. A ring gear 33*a* of the differential mechanism 33 is engaged with the differential input gear 32*a* of the differential input shaft 32. The differential mechanism 33 has a similar structure to that of conventional one and transmits rotation of the differential input gear 32*a* to the left and right front axles 2. The idle shaft 34 has an idle input gear 34*a* at its base end portion and a parking brake unit 60 at its tip end. The idle shaft 34 is rotatably supported in the transfer case 35 in a state in which the idle input gear 34*a* is engaged with the transfer gear 32*b* and the tip end is oriented to the rear side of the vehicle body BD. As shown in FIG. 6, the idle shaft 34 is disposed almost directly below the traveling hydraulic pump 10 by being offset to a lower right position of the vehicle body BD from the differential input shaft 32. Although it is not clearly shown in the drawings, the parking brake unit 60 is of what is called drum type in which a brake shoe mounted to the transfer case 35 is pressed against a drum rotating with the idle shaft 34 to thereby obtain a braking force. Because the idle shaft 34 is offset to the lower right position of the vehicle body BD from the differential input shaft 32, the hydraulic motor 20 and the traveling hydraulic pump 10 do not come in contact with the parking brake unit 60.

In the forklift formed as described above, if the engine 1 is caused to operate, the operating machine hydraulic pump 50 is driven through the PTO unit 40 to supply the oil to the mast cylinders MC and the tilt cylinders TC. In this way, in the forklift, the forks F can be moved along the vertical direction with respect to the masts M by causing the mast cylinders MC to operate and the masts M can be brought into the forward tilting attitudes and the rearward tilting attitudes with respect to the vehicle body BD by causing the tilt cylinders TC to operate.

At the same time, if the engine 1 is caused to operate, the traveling hydraulic pump 10 is driven through the PTO unit 40 and the oil is supplied to the hydraulic motor 20 from the traveling hydraulic pump 10.

If the parking brake unit 60 is in a released state, the hydraulic motor 20 to which the oil is supplied from the traveling hydraulic pump 10 rotates. If the drive shaft 20*a* of the hydraulic motor 20 rotates, the rotation is transmitted to the differential mechanism 33 through the main input shaft 31, the main input gear 31*a*, the transfer gear 32*b*, and the differential input gear 32*a*, the two front axles 2 rotate, and the forklift moves forward, for example. If the hydraulic motor 20 rotates in a reverse direction, the front axles 2 rotate in the reverse direction as well, and the forklift moves rearward.

On the other hand, if the parking brake unit 60 obstructs rotation of the idle shaft 34 with respect to the transfer case 35, both of the differential input shaft 32 engaged with the idle input gear 34*a* with the transfer gear 32*b* interposed therebetween and the main input shaft 31 engaged with the transfer gear 32*b* with the main input gear 31*a* interposed therebetween can not rotate with respect to the transfer case 35. Therefore, the two front axles 2 cannot rotate in the same direction, which maintains the forklift in a parked state.

Here, in the above-described forklift, the power of the hydraulic motor 20 is divided and transmitted to the left and right front wheels FW, which does not increase diameters of the axle cases 3. In this way, it is possible to bring positions of the mast cylinders MC close to the axle cases 3 and it is possible to form the forklift driven by the hydraulic motor 20 without increasing a counterweight CW (see FIG. 1).

Moreover, because the traveling hydraulic pump 10 is disposed in a state in which the pump input shaft 10*a* is offset from the output shaft 1*a* of the engine 1, the traveling hydraulic pump 10 and the hydraulic motor 20 can be arranged side by side without loosing weight balance.

Therefore, it is possible to suppress increase in dimensions of an outside shape of the vehicle body BD to secure mobility without impairing traveling performance and operating performance.

REFERENCE SIGNS LIST

1 ENGINE
1*a* OUTPUT SHAFT
2 FRONT AXLE
3 AXLE CASE
10 TRAVELING HYDRAULIC PUMP
10*a* PUMP INPUT SHAFT
20 HYDRAULIC MOTOR
20*a* DRIVE SHAFT
40 PTO UNIT
50 OPERATING MACHINE HYDRAULIC PUMP
50*a* PUMP INPUT SHAFT
BD VEHICLE BODY

The invention claimed is:

1. A forklift comprising:
an engine mounted in a state in which an output shaft is along a front-rear direction of a vehicle body;
a traveling hydraulic pump and an operating machine hydraulic pump driven by the engine; and
a hydraulic motor operated by oil supplied from the traveling hydraulic pump, power of the hydraulic motor being transmitted to a drive axle to cause the forklift to travel,
wherein a PTO unit is provided to the output shaft of the engine, power is configured to be respectively transmitted to the traveling hydraulic pump and the operating machine hydraulic pump through the PTO unit, and the traveling hydraulic pump is disposed to a first face of the PTO unit facing the hydraulic motor in a state in which an input shaft of the traveling hydraulic pump is offset from the output shaft of the engine, and the hydraulic motor is disposed in a state in which the drive shaft of the hydraulic motor is offset from the output shaft of the engine and the input shaft of the traveling hydraulic pump, respectively, and the hydraulic motor is arranged side by side with the traveling hydraulic pump, and the operating machine hydraulic pump is mounted to a second face of the PTO unit mounted with the engine, and an input shaft of the operating machine hydraulic pump is offset from the traveling hydraulic pump, and the operating machine hydraulic pump is disposed under the engine to be side by side with the engine.

2. The forklift according to claim 1, further comprising an axle case housing therein the drive axle,
wherein the hydraulic motor is mounted to the axle case in a state in which a drive shaft of the hydraulic motor is disposed along the output shaft of the engine.

3. The forklift according to claim 1, wherein the traveling hydraulic pump and the hydraulic motor are of variable displacement type and connected by a hydraulic closed circuit to form an HST.

* * * * *